United States Patent
Zhou et al.

(10) Patent No.: US 10,942,402 B2
(45) Date of Patent: Mar. 9, 2021

(54) ELECTRIC RESPONSE INFRARED REFLECTION DEVICE AND PREPARATION METHOD THEREOF

(71) Applicants: SOUTH CHINA NORMAL UNIVERSITY, Guangdong (CN); SHENZHEN GUOHUA OPTOELECTRONICS CO., LTD., Guangdong (CN); ACADEMY OF SHENZHEN GUOHUA OPTOELECTRONICS, Guangdong (CN)

(72) Inventors: Guofu Zhou, Guangdong (CN); Xiaowen Hu, Guangdong (CN); Nan Li, Guangdong (CN)

(73) Assignees: SOUTH CHINA NORMAL UNIVERSITY, Guangzhou (CN); SHENZHEN GUOHUA OPTOELECTRONICS CO., LTD., Shenzhen (CN); ACADEMY OF SHENZHEN GUOHUA OPTOELECTRONICS, Shenzhen (CN)

( * ) Notice: Subject to any disclaimer, the term of this patent is extended or adjusted under 35 U.S.C. 154(b) by 0 days.

(21) Appl. No.: 16/483,804

(22) PCT Filed: Nov. 8, 2017

(86) PCT No.: PCT/CN2017/109811
§ 371 (c)(1),
(2) Date: Aug. 6, 2019

(87) PCT Pub. No.: WO2018/145494
PCT Pub. Date: Aug. 16, 2018

(65) Prior Publication Data
US 2019/0391437 A1    Dec. 26, 2019

(30) Foreign Application Priority Data

Feb. 10, 2017 (CN) .......................... 201710073525.1

(51) Int. Cl.
*G02F 1/1334* (2006.01)
*G02F 1/1347* (2006.01)
*G02F 1/1337* (2006.01)
*G02F 1/137* (2006.01)
*G02F 1/1339* (2006.01)

(52) U.S. Cl.
CPC .......... *G02F 1/13473* (2013.01); *G02F 1/137* (2013.01); *G02F 1/1334* (2013.01);
(Continued)

(58) Field of Classification Search
CPC .. G02F 1/1334; G02F 1/1347; G02F 1/13471; G02F 2001/13345
See application file for complete search history.

(56) References Cited

U.S. PATENT DOCUMENTS

2012/0086904 A1* 4/2012 Oki ........................ G02B 5/208
349/201

FOREIGN PATENT DOCUMENTS

CN    105652549 A    6/2016
CN    105676489 A    6/2016
(Continued)

OTHER PUBLICATIONS

International Search Report and Written Opinion from PCT/CN2017/109811, dated Feb. 9, 2018 (8 pages).

*Primary Examiner* — Thanh Nhan P Nguyen
(74) *Attorney, Agent, or Firm* — Ware, Fressola, Maguire & Barber LLP

(57) ABSTRACT

An electric response infrared reflection device and a preparation method thereof. The device comprises three light-transmitting conductive substrates which are oppositely arranged. Two adjacent light-transmitting conductive sub-
(Continued)

strates of the three light-transmitting conductive substrates are respectively packaged to form a first adjusting area and a second adjusting area. Both the first adjusting area and the second adjusting area are filled with liquid crystal layers. Each of the liquid crystal layers comprises a mixed liquid crystal material. The mixed liquid crystal material comprises a chiral nematic phase liquid crystal, a monomer, a photoinitiator, and a chiral dopant. The spiral direction of the chiral nematic phase liquid crystal in the first adjusting area is opposite to the spiral direction of the chiral nematic phase liquid crystal in the second adjusting area, so that the total reflection of an infrared band can be implemented.

20 Claims, 3 Drawing Sheets

(52) U.S. Cl.
CPC .......... *G02F 1/1337* (2013.01); *G02F 1/1339* (2013.01); *G02F 2001/13345* (2013.01); *G02F 2001/13478* (2013.01); *G02F 2001/133738* (2013.01); *G02F 2203/055* (2013.01); *G02F 2203/11* (2013.01); *G02F 2203/58* (2013.01)

(56) References Cited

FOREIGN PATENT DOCUMENTS

| | | |
|---|---|---|
| CN | 105676507 A | 6/2016 |
| CN | 106019754 A | 10/2016 |
| CN | 106646986 A | 5/2017 |
| JP | 2006098907 A | 4/2006 |

\* cited by examiner

ELECTRIC RESPONSE INFRARED REFLECTION DEVICE AND PREPARATION METHOD THEREOF

TECHNICAL FIELD

The present disclosure relates generally to the field of optical and liquid crystal device technologies, and more particularly, to an electric response infrared reflection device and a preparation method thereof.

BACKGROUND

For achieving the purpose of sunlight transmission and reflection, glass is usually coated with a film, so that light of a certain wavelength in a ray of light can be reflected or transmitted by a glass window. Coating one or more layers of metal, alloy or metal compound films on a surface of the coated glass to change an optical property of the coated glass, so as to achieve the purpose of reflecting or transmitting the light of a certain wavelength.

Films made of different materials may be used according to different light reflection and transmission requirements. The surface of the glass is coated with one or more layers of films composed of metals such as chromium, titanium or stainless steel or the compound thereof, so that a product is rich in color, and has an appropriate transmittance for visible light and a higher reflectance for infrared light.

However, after the coated glass is molded, the optical property thereof may not be changed with environmental changes or personal preferences, which cannot meet people's needs.

Moreover, most of the materials used in the coated glass are ionic crystals doped with metal and metal oxide, which are easy to interfere with navigation and communication systems.

For the reasons above, it is difficult to popularize the coated glass on a large scale. The development of an infrared reflection film with an adjustable infrared reflection waveband with 100% reflection may better meet people's needs and further be widely popularized in the market.

SUMMARY

The technical problem to be solved by the present disclosure is to provide an electric response infrared reflection device and a preparation method thereof.

The technical solutions adopted in the present disclosure are as follows.

An electric response infrared reflection device comprises three light-transmitting conductive substrates which are oppositely arranged, wherein two adjacent light-transmitting conductive substrates of the three light-transmitting conductive substrates are respectively packaged to form a first adjusting area and a second adjusting area, the first adjusting area and the second adjusting area are both filled with a liquid crystal layer, the liquid crystal layer comprises a mixed liquid crystal material, the mixed liquid crystal material comprises a chiral nematic phase liquid crystal, a monomer, a photoinitiator and a chiral dopant, a spiral direction of the chiral nematic phase liquid crystal in the first adjusting area is opposite to a spiral direction of the chiral nematic phase liquid crystal in the second adjusting area, under irradiation of ultraviolet light, the monomer is polymerized into a netted polymer under an effect of the photoinitiator, the netted polymer can capture impurity positive ions in the liquid crystal mixture, under an electric field, a movement of the impurity positive ions drives the netted polymer to move, and the netted polymer drives the chiral nematic phase liquid crystal to move, so that a screw pitch of the chiral negative liquid crystal is changed.

In some preferred embodiments, each of the light-transmitting conductive substrates comprises a substrate and a conducting layer, a surface of the substrate opposite to the other adjacent substrate is provided with a conducting layer, and upper and lower surfaces of the substrate arranged in the middle are both provided with a conducting layer.

In some further preferred embodiments, the conducting layer of the upper surface of the substrate arranged at the bottom and the conducting layer of the lower surface of the substrate arranged at the middle are respectively connected with two poles of a first direct current power supply, and the conducting layer of the lower surface of the substrate arranged at the top and the conducting layer of the upper surface of the substrate arranged at the middle are respectively connected with two poles of a second direct current power supply.

In some further preferred embodiments, the light-transmitting conductive substrate arranged at the middle may comprise two substrates which are mutually attached, an upper surface of the upper substrate is provided with a conducting layer, and a lower surface of the lower substrate is provided with a conducting layer.

In preferred embodiments of the solutions above, a surface of the light-transmitting conductive substrate opposite to the other adjacent light-transmitting conductive substrate is provided with a parallel alignment layer.

In preferred embodiments of the solutions above, the liquid crystal layer also comprises a spacer for controlling a thickness of the liquid crystal layer.

In preferred embodiments of the solutions above, a size of the screw pitch of the chiral nematic phase liquid crystals in the first adjusting and in the second adjusting area are the same.

In preferred embodiments of the solutions above, electric fields applied to the first adjusting and the second adjusting area have the same or opposite directions.

In addition, the present disclosure further provides a preparation method for the electric response infrared reflection device above, which comprises the following steps:

S1: preparing three light-transmitting conductive substrates, wherein each of the light-transmitting conductive substrates comprises a substrate and a conducting layer, and upper and lower surfaces of one of the substrates are both provided with a conducting layer;

S2: opposing one sides of the three light-transmitting conductive substrates having the conducting layer, and sub-packaging into a liquid crystal box, wherein the liquid crystal box has two adjusting areas; and S3: mixing the chiral nematic phase liquid crystal, the monomer and the photoinitiator with a dextral chiral dopant to obtain a mixed liquid crystal material A, mixing the chiral nematic phase liquid crystal, the monomer and the photoinitiator with a levorotatory chiral dopant to obtain a mixed liquid crystal material B, and respectively injecting the mixed liquid crystal material A and the mixed liquid crystal material B into the two adjusting areas.

In some preferred embodiments, after the S3, the method further comprises a step of irradiating the liquid crystal box with ultraviolet light.

The present disclosure has the beneficial effects as follow.

The present disclosure provides an electric response infrared reflection device and a preparation method thereof, the infrared reflection device comprises three light-transmitting conductive substrates which are oppositely arranged, wherein two adjacent light-transmitting conductive substrates of the three light-transmitting conductive substrates are respectively packaged to form the first adjusting area and the second adjusting area, the first adjusting area and the second adjusting area are both filled with the liquid crystal layer, the liquid crystal layer comprises the mixed liquid crystal material, the mixed liquid crystal material comprises the chiral nematic phase liquid crystal, the monomer, the photoinitiator and the chiral dopant, the chiral nematic phase liquid crystal can reflect infrared light, and a space of a rotated by a director of the chiral nematic phase liquid crystal material in a direction of a spiral axis is called the screw pitch (which may be represented by P). The spiral direction of the chiral nematic phase liquid crystal in the first adjusting area is opposite to the spiral direction of the chiral nematic phase liquid crystal in the second adjusting area, in theory and practice, a chiral nematic phase in one chiral rotation direction may only reflect corresponding polarized light thereof, while the polarized light in the other polarization rotation direction will have complete transmittance. Therefore, for a mixed liquid crystal material with only a single chiral rotation direction, a reflectivity of reflected infrared light may only reach 50% at most under a normal natural light irradiation state, that is, the transmittance may reach 50%. Regarding to the electric response infrared total-reflection device provided by the present disclosure, by arranging the two adjusting areas in the device, the chiral nematic phase liquid crystal materials with opposite spiral directions are respectively filled in the two adjusting areas, so that infrared total-reflection is realized, and 100% of infrared light may be reflected in a certain infrared waveband, that is, the total-reflection in a certain infrared waveband is realized. Moreover, in the device, the two adjusting areas do not affect each other in orientation of the mixed liquid crystal material, and in a working state, according to a connection relationship between a power supply and a voltage connected as well as a switch, various working conditions may exist, which may completely meet most of people's requirements. The voltages connected with the two adjusting areas may be the same or different, and the states of the adjusting areas may be adjusted according to people's requirements on an indoor temperature.

Moreover, the monomer in the mixed liquid crystal material is polymerized into the netted polymer under the effect of the photoinitiator, the netted polymer may capture the impurity positive ions in the liquid crystal mixture, the adjusting area may be placed under the electric field as long as the voltage is applied on the light-transmitting conductive substrate, the impurity positive ions may move towards the light-transmitting conductive substrate connected with a negative electrode of the power supply under the electric field, the movement of the impurity positive ions drives the netted polymer to move, and the netted polymer drives the chiral nematic phase liquid crystal to move, so that the screw pitch of the chiral negative liquid crystal is changed. Under a powered state, in the adjusting areas, a polymer network moves towards the negative electrode because of capturing the positive ions, the chiral nematic phase liquid crystal is dispersed in the polymer network, and the chiral nematic phase liquid crystal moves towards the negative electrode under the drive of the polymer network, so that the liquid crystal screw pitch close to the light-transmitting conductive substrate connected with the negative electrode of the power supply is reduced, the liquid crystal screw pitch close to the light-transmitting conductive substrate connected with the positive electrode of the power supply is increased, and a spiral structure with a certain screw pitch gradient is formed in the adjusting area as a whole. According to the following formula: $\lambda = \bar{n}P$ (1), $\lambda$ is a reflection wavelength of the chiral nematic phase liquid crystal with the single screw pitch, and $\bar{n}$ is an average birefringence of the liquid crystal; a value of a may be calculated by the formula $$\bar{n} = \sqrt{\frac{n_e^2 + 2n_o^2}{3}}, \quad (2)$$

and in the formula (2), $n_e$ is an ordinary refractive index, and $n_o$ is an extraordinary refractive index; and according to the formula $\Delta\lambda = (n_e - n_o) \times P = \Delta n \times P$ (3), $\Delta n$ is a difference of birefringence indexes, and $\Delta\lambda$ is a bandwidth of a reflection spectrum. It can be seen from the formula above that when a value of P becomes a gradient range, the reflected wavelength and the reflected bandwidth of the mixed liquid crystal material may also be increased, thus widening the infrared reflection bandwidth. In addition, the screw pitch of the mixed liquid crystal material may be changed by adjusting the voltage applied to the light-transmitting conductive substrate and adjusting a proportion of each component in the mixed liquid crystal material, thus adjusting the reflection waveband of an infrared reflection film to meet the requirements of light reflection and transmission.

In conclusion, the present disclosure provides an infrared reflection device, which may not only realize the infrared total-reflection of a certain waveband, but also realize reflection waveband adjustment.

DETAILED DESCRIPTION

First Embodiment

Three substrates are cut, conducting layers are prepared on surfaces of the substrates, upper and lower surfaces of one of the substrates are respectively provided with a conducting layer, the surfaces of the three light-transmitting conductive substrates with a conducting layer are oppositely arranged to be packaged into a liquid crystal box, and the liquid crystal box has two adjusting areas; 75 to 85 parts by mass of chiral nematic phase liquid crystals, 13 to 14.5 parts by mass of dextral chiral dopants, 3 to 5 parts by mass of monomers and 0.5 to 1 part by mass of photoinitiator are mixed to obtain a mixed liquid crystal material A, 87 to 93 parts by mass of chiral nematic phase liquid crystals, 3 to 4 parts by mass of levorotatory chiral dopants, 3 to 5 parts by mass of monomers and 0.5 to 1 part by mass of photoinitiator are mixed to obtain a mixed liquid crystal material B, wherein, the liquid crystal is a negative liquid crystal LC-2079, the levorotatory chiral dopant is 5811 of Merck Corporation of Germany, the dextral chiral dopant is R811 of Merck Corporation of Germany, the liquid crystal shows the chiral nematic phase liquid crystal under an effect of the chiral dopant, the monomer is any one of RM82 and RM257 of Merck Corporation of Germany, and the photoinitiator is any one of Irgacure-651 and Irgacure-369 of Merck Corporation of Germany; the mixed liquid crystal material A and the mixed liquid crystal material B are respectively filled into the two adjusting areas; and ultraviolet light is used to irradiate the liquid crystal box, so that the monomer is polymerized under an effect of the photoinitiator to form a network polymer, so as to obtain an electric response infrared reflection device.

Figure 1:
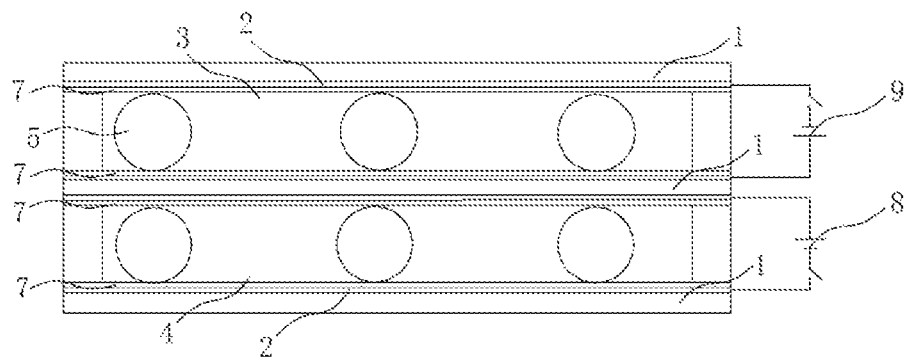
FIG. 1 is a cross section view of an electric response infrared reflection device.
Figure 2:
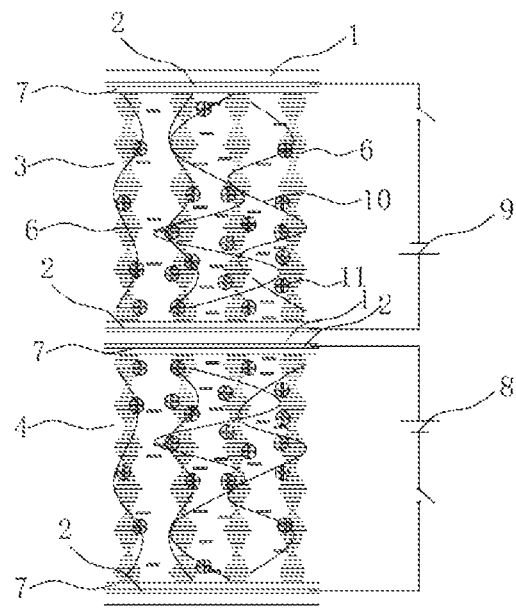
FIG. 2 is a partial cross section view of the electric response infrared reflection device in an unpowered state.
Figure 3:
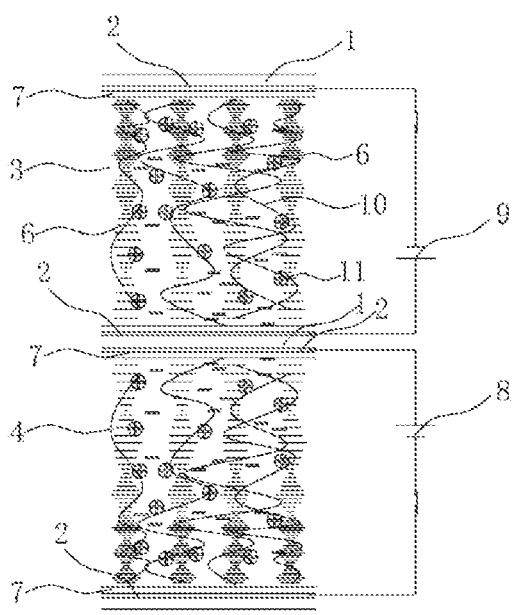
FIG. 3 is a partial cross section view of the electric response infrared reflection device in a powered state.

The cross section view of the infrared reflection device prepared above is shown in FIG. 1, the electric response infrared reflection device comprises three light-transmitting conductive substrates which are oppositely arranged, each of the light-transmitting conductive substrates comprises a substrate 1 and a conducting layer 2, a surface of the substrate 1 opposite to the other adjacent substrate 1 is provided with a conducting layer 2, and upper and lower surfaces of the substrate 1 arranged in the middle are both provided with a conducting layer 2. Two adjacent light-transmitting conductive substrates of the three light-transmitting conductive substrates are respectively packaged to form a first adjusting area 3 and a second adjusting area 4, the first adjusting area 3 and the second adjusting area 4 are both filled with a liquid crystal layer, the liquid crystal layer comprises a mixed liquid crystal material and a plurality of spacers 5 for controlling a thickness of the liquid crystal layer, a height of the spacer 5 is equal to the thickness of the liquid crystal layer, the spacer 5 may be any shape, and a material of the spacer 5 is any one of actyl resin, glass and silicone resin, A surface of the light-transmitting conductive substrate opposite to the other adjacent light-transmitting conductive substrate is provided with a parallel alignment layer 7. The mixed liquid crystal material comprises a chiral nematic phase liquid crystal 6, a monomer, a photoinitiator and a chiral dopant, the chiral nematic phase liquid crystal 6 is helical, and a spiral direction of the chiral nematic phase liquid crystal 6 in the first adjusting area 3 is opposite to a spiral direction of the chiral nematic phase liquid crystal 6 in the second adjusting area 4. A chiral nematic phase in one chiral rotation direction may only reflect corresponding polarized light thereof, and the polarized light in the other polarization rotation direction will have complete transmittance. Therefore, for the mixed liquid crystal material with only a single chiral rotation direction, a reflectivity of reflected infrared light may only reach 50% at most under a normal natural light irradiation state, that is, the transmittance may reach 50%. Regarding to the electric response infrared reflection device provided by the present disclosure, by arranging two adjusting areas in the device, the chiral nematic phase liquid crystal materials with opposite spiral directions are respectively filled in the two adjusting areas, so that infrared total-reflection is realized, and 100% of infrared light may be reflected in a certain infrared waveband, that is, the total-reflection in a certain infrared waveband is realized.

The conducting layer 2 of the upper surface of the substrate 1 arranged at the bottom and the conducting layer 2 of the lower surface of the substrate 1 arranged at the middle are respectively connected with two poles of a first direct current power supply 8, and the conducting layer 2 of the lower surface of the substrate 1 arranged at the top and the conducting layer 2 of the upper surface of the substrate 1 arranged at the middle are respectively connected with two poles of a second direct current power supply 9. In the embodiment, the conducting layer 2 of the upper surface of the substrate 1 arranged at the bottom is connected with a negative electrode of the first direct current power supply 8, the conducting layer 2 of the lower surface of the substrate 1 arranged at the middle is connected with a positive electrode of the first direct current power supply 8, the conducting layer 2 of the lower surface of the substrate 1 arranged at the top is connected with a negative electrode of the second direct current power supply 9, and the conducting layer 2 of the upper surface of the substrate 1 arranged at the middle is connected with a positive electrode of the second direct current power supply 9. Voltages of the first direct current power supply 8 and the second direct current power supply 9 may be the same or different, and may be adjusted according to actual requirements.

When the three light-transmitting conductive substrates are not powered, the screw pitch of the chiral nematic phase liquid crystal 6 in the first adjusting area 3 may be equal to that in the second adjusting area 4 by adjusting a proportion of each component in the mixed liquid crystal material. Under irradiation of ultraviolet light, the monomer is polymerized into a network polymer 10 under the effect of the photoinitiator, the network polymer 10 may capture impurity positive ions 11 in the liquid crystal mixture, under the electric field, a movement of the impurity positive ions 11 drives the network polymer 10 to move, and the network polymer 10 drives the chiral nematic phase liquid crystal 6 to move, so that the screw pitch of the chiral nematic phase liquid crystal 6 close to the light-transmitting conductive substrate connected with the negative electrode of the power supply is reduced, the screw pitch of the chiral nematic phase liquid crystal 6 close to the light-transmitting conductive substrate connected with the positive electrode of the power supply is increased, and a spiral structure with a certain screw pitch gradient is formed in the adjusting area as a whole, thus widening the infrared reflection bandwidth of the infrared reflection device.

Figure 4:
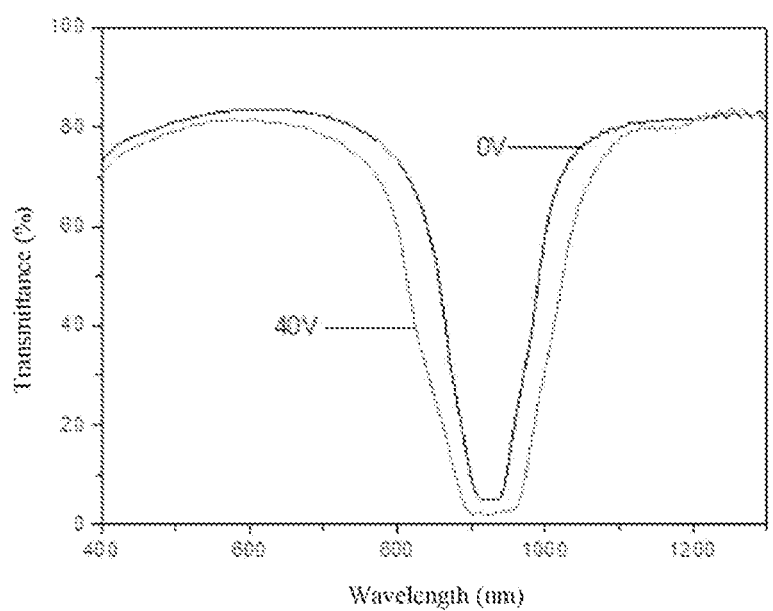
FIG. 4 is a transmission spectrum diagram of the electric response infrared reflection device at voltages of 0 V and 40 V.

The first adjusting area 3 and the second adjusting area 4 are respectively connected with 0 V (that is, no power supply voltage is actually applied) and 40 V power supply voltages to perform an infrared reflection experiment and measure a reflection spectrum, and an experimental result is shown in FIG. 4. It may be seen from FIG. 4 that the infrared reflection waveband of the infrared reflection device provided by the present disclosure may be adjusted by, adjusting the voltage.

Second Embodiment

The second embodiment is basically the same as the first embodiment, but differs in that, the levorotatory chiral dopant is S1011 of Merck Corporation of Germany, the dextral chiral dopant is 81011, the conducting layer 2 of the upper surface of the substrate 1 arranged at the bottom is connected with a negative electrode of a first direct current power supply 8, the conducting layer 2 of the lower surface of the substrate 1 arranged at the middle is connected with a positive electrode of the first direct current power supply 8, the conducting layer 2 of the lower surface of the substrate 1 arranged at the top is connected with a positive electrode of the second direct current power supply 9, and the conducting layer 2 of the upper surface of the substrate 1 arranged at the middle is connected with a negative electrode of the second direct current power supply 9.

What is claimed:

1. An electric response infrared reflection device, comprising:

three light-transmitting conductive substrates which are oppositely arranged, two adjacent light-transmitting conductive substrates of the three light-transmitting conductive substrates are respectively packaged to form a first adjusting area and a second adjusting area, wherein the first adjusting area and the second adjusting area are both filled with a liquid crystal layer comprising a mixed liquid crystal material comprising a chiral nematic phase liquid crystal, a monomer, a photoinitiator and a chiral dopant, wherein a spiral direction of the chiral nematic phase liquid crystal in the first adjusting area is opposite to a spiral direction of the chiral nematic phase liquid crystal in the second adjusting area, wherein under irradiation of ultraviolet light, the monomer is polymerized into a netted polymer under an effect of the photoinitiator, wherein the netted polymer can capture impurity positive ions in the mixed liquid crystal material, and wherein under an electric field, a movement of the impurity positive ions drives the netted polymer to move, and the netted polymer drives the chiral nematic phase liquid crystal to move, so that a screw pitch of the chiral nematic phase liquid crystal close to the light-transmitting conductive substrate connected with the negative electrode of the power supply is reduced, while the screw pitch of the chiral nematic phase liquid crystal close to the light-transmitting conductive substrate connected with the positive electrode of the power supply is increased, and thus forming a spiral structure with a screw pitch gradient in the adjusting area, and widening infrared reflection bandwidth of the infrared reflection device.

2. The electric response infrared reflection device of claim 1, wherein each of the light-transmitting conductive substrates comprises a substrate and a conducting layer, a surface of the substrate opposite to the other adjacent substrate is provided with a conducting layer, and upper and lower surfaces of the substrate arranged in the middle are both provided with a conducting layer.

3. The electric response infrared reflection device of claim 2, further comprising a parallel alignment layer arranged on a surface of the light-transmitting conductive substrate opposite to the other adjacent light-transmitting conductive substrate.

4. The electric response infrared reflection device of claim 2, wherein the liquid crystal layer also comprises a spacer for controlling a thickness of the liquid crystal layer.

5. The electric response infrared reflection device of claim 2, wherein a size of the screw pitch of the chiral nematic phase liquid crystals in the first adjusting and the second adjusting area are the same.

6. The electric response infrared reflection device of claim 2, wherein a directions of the electric fields applied to the first adjusting and the second adjusting area are the same or opposite.

7. A preparation method of the electric response infrared reflection device of claim 2, comprising the following steps:

S1: preparing three light-transmitting conductive substrates, wherein each of the light-transmitting conductive substrates comprises a substrate and a conducting layer, and upper and lower surfaces of one of the substrates are both provided with a conducting layer;

S2: opposing sides of the three light-transmitting conductive substrates having the conducting layer, and sub-packaging into a liquid crystal box, wherein the liquid crystal box has two adjusting areas; and S3: mixing the chiral nematic phase liquid crystal, the monomer and the photoinitiator with a dextral chiral dopant to obtain a mixed liquid crystal material A, mixing the chiral nematic phase liquid crystal, the monomer and the photoinitiator with a levorotatory chiral dopant to obtain a mixed liquid crystal material B, and respectively injecting the mixed liquid crystal material A and the mixed liquid crystal material B into the two adjusting areas.

8. The electric response infrared reflection device of claim 2, further comprising a first direct current power supply and a second direct current power supply, the conducting layer of the upper surface of the substrate arranged at the bottom and the conducting layer of the lower surface of the substrate arranged at the middle are respectively connected with two poles of the first direct current power supply, and the conducting layer of the lower surface of the substrate arranged at the top and the conducting layer of the upper surface of the substrate arranged at the middle are respectively connected with two poles of the second direct current power supply.

9. The electric response infrared reflection device of claim 8, wherein the light-transmitting conductive substrate arranged at the middle comprise two substrates which are mutually attached, an upper surface of the upper substrate is provided with a conducting layer, and a lower surface of the lower substrate is also provided with a conducting layer.

10. The electric response infrared reflection device of claim 8, further comprising a parallel alignment layer arranged on a surface of the light-transmitting conductive substrate opposite to the other adjacent light-transmitting conductive substrate.

11. The electric response infrared reflection device of claim 8, wherein the liquid crystal layer also comprises a spacer for controlling a thickness of the liquid crystal layer.

12. The electric response infrared reflection device of claim 8, wherein a size of the screw pitch of the chiral nematic phase liquid crystals in the first adjusting and the second adjusting area are the same.

13. The electric response infrared reflection device of claim 8, wherein a directions of the electric fields applied to the first adjusting and the second adjusting area are the same or opposite.

14. The electric response infrared reflection device of claim 2, wherein the light-transmitting conductive substrate arranged at the middle comprise two substrates which are mutually attached, an upper surface of the upper substrate is provided with a conducting layer, and a lower surface of the lower substrate is also provided with a conducting layer.

15. The electric response infrared reflection device of claim 1, further comprising a parallel alignment layer arranged on a surface of the light-transmitting conductive substrate opposite to the other adjacent light-transmitting conductive substrate.

16. The electric response infrared reflection device of claim 1, wherein the liquid crystal layer also comprises a spacer for controlling a thickness of the liquid crystal layer.

17. The electric response infrared reflection device of claim 1, wherein a size of the screw pitch of the chiral nematic phase liquid crystals in the first adjusting and the second adjusting area are the same.

18. The electric response infrared reflection device of claim 1, wherein a directions of the electric fields applied to the first adjusting and the second adjusting area are the same or opposite.

19. A preparation method of the electric response infrared reflection device of claim 1, comprising the following steps:
S1: preparing three light-transmitting conductive substrates, wherein each of the light-transmitting conductive substrates comprises a substrate and a conducting layer, and upper and lower surfaces of one of the substrates are both provided with a conducting layer;
S2: opposing sides of the three light-transmitting conductive substrates having the conducting layer, and sub-packaging into a liquid crystal box, wherein the liquid crystal box has two adjusting areas; and
S3: mixing the chiral nematic phase liquid crystal, the monomer and the photoinitiator with a dextral chiral dopant to obtain a mixed liquid crystal material A, mixing the chiral nematic phase liquid crystal, the monomer and the photoinitiator with a levorotatory chiral dopant to obtain a mixed liquid crystal material B, and respectively injecting the mixed liquid crystal material A and the mixed liquid crystal material B into the two adjusting areas.

20. The preparation method of the electric response infrared reflection device of claim 19, wherein after the S3, the method further comprises a step of irradiating the liquid crystal box with ultraviolet light.

\* \* \* \* \*